United States Patent
Garner

(10) Patent No.: US 6,646,773 B2
(45) Date of Patent: Nov. 11, 2003

(54) DIGITAL MICRO-MIRROR HOLOGRAPHIC PROJECTION

(75) Inventor: Harold R. Garner, Flower Mound, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/864,124

(22) Filed: May 23, 2001

(65) Prior Publication Data
US 2002/0176127 A1 Nov. 28, 2002

(51) Int. Cl.⁷ .................................................. G03H 1/04
(52) U.S. Cl. .................. 359/35; 359/1; 359/9; 359/21
(58) Field of Search ............................ 359/9, 10, 11, 359/29, 35, 1, 21, 32, 33; 382/276, 280

(56) References Cited

U.S. PATENT DOCUMENTS

| | | | |
|---|---|---|---|
| 4,062,618 A | 12/1977 | Steensma | 350/3.5 |
| 4,743,113 A | 5/1988 | Jubinski | 356/345 |
| 4,866,699 A | 9/1989 | Brackett et al. | 370/3 |
| 4,882,775 A | 11/1989 | Coleman | 455/617 |
| 5,136,666 A | 8/1992 | Anderson et al. | 385/24 |
| 5,256,869 A | 10/1993 | Lin et al. | 250/201.9 |
| 5,363,455 A * | 11/1994 | Nishii et al. | 382/211 |
| 5,459,600 A | 10/1995 | Davis et al. | 359/173 |
| 5,515,183 A * | 5/1996 | Hashimoto | 359/9 |
| 5,606,446 A | 2/1997 | Davis et al. | 359/173 |
| 5,652,666 A * | 7/1997 | Florence et al. | 359/22 |
| 5,703,975 A | 12/1997 | Miller et al. | 385/16 |
| 5,745,267 A | 4/1998 | Hart | 359/35 |
| 5,771,095 A * | 6/1998 | Prikryl et al. | 356/521 |
| 5,801,812 A | 9/1998 | Lo et al. | 355/22 |
| 5,802,222 A | 9/1998 | Rasch et al. | 385/1 |
| 5,949,558 A * | 9/1999 | Psaltis et al. | 359/22 |
| 6,018,402 A | 1/2000 | Campbell et al. | 359/22 |
| 6,023,365 A | 2/2000 | McDonald | 359/291 |
| 6,035,078 A | 3/2000 | Dagens et al. | 385/14 |
| 6,094,283 A | 7/2000 | Preston | 359/15 |
| 6,222,650 B1 * | 4/2001 | Long | 359/2 |
| 6,281,994 B1 * | 8/2001 | Horikoshi et al. | 359/32 |

OTHER PUBLICATIONS

K. Iizuka, "Engineering Optics", Springer–Verlag, Berlin, 1985, pp. 265.–275.*

P. Hariharan, "Optical Holography: Principles, techniques, and applications", Cambridge University Press, Cambridge, 1996, pp. 69–84.*

* cited by examiner

Primary Examiner—Thong Nguyen
Assistant Examiner—Arnel C. Lavarias
(74) Attorney, Agent, or Firm—Gardere Wynne Sewell LLP

(57) ABSTRACT

The present invention relates to a method and apparatus for display of three-dimensional images and production of mega-channel phase-encoded optical communications. In certain embodiments, the device of the present invention allows for the creation and display of real-time, three-dimensional moving holograms. In the present invention, a computed image or virtual model of a real object is stored in a computer or dedicated digital signal processor (DSP). The stored image or model is then converted by the computer or DSP into its Fourier, or holographic, transform. The holographic transform is displayed on a light modulation device that is illuminated by a one portion of a laser emission. The remaining portion of the same laser emission is combined with the holographic transform at a plane to create a three-dimensional image.

17 Claims, 1 Drawing Sheet

“DIGITAL MICRO-MIRROR HOLOGRAPHIC PROJECTION”

DIGITAL MICRO-MIRROR HOLOGRAPHIC PROJECTION

TECHNICAL FIELD OF THE INVENTION

The present invention relates to methods and apparatuses for generating three-dimensional images, and in particular to devices employing light emitting sources to generate three-dimensional holograms.

BACKGROUND OF THE INVENTION

Holography is an application of laser technology, best known for its ability to reproduce three-dimensional images. Early holography was limited to using film to record intensity and phase information of light incident on the scene.

More specifically, the principle of operation of film holograms or "stereoscopic photography" is that the film records the interference pattern produced by two coherent beams of light, i.e., "recording beams". One recording beam is scattered from the scene being recorded and one recording beam is a reference beam. The interference patterns recorded on the film encode the scene's appearance from a range of viewpoints. Depending on the arrangement of the recording beams, and therefore the reconstructing and reconstructed beams, with respect to the film, the hologram may be a transmission-type or reflection-type hologram.

For a transmission-type hologram, reconstructing the holographic image is accomplished by shining one of the recording beams, as a "reconstructing" beam, through the developed hologram. By diffraction, the recorded interference pattern redirects some of the light to form a replica of the other recording beam. This replica beam, the "reconstructed" beam, travels away from the hologram with the same variation in phase and intensity of the original beam. Thus, for the viewer, the reconstructed wavefront is indistinguishable from the original wavefront, including the three dimensional aspects of the scene.

Holography differs from stereoscopic photography in that the holographic image exhibits full parallax by affording an observer a full range of viewpoints of the image from every angle, both horizontal and vertical, and full perspective, i.e., it affords the viewer a full range of perspectives of the image from every distance from near to far. As such, a hologram contains a much higher level of visual and spatial information as compared to a stereoscopic image having the same resolution. In the same manner that a two-dimensional visual image can be represented in a two-dimensional array of picture elements, or "pixels," a holographic image is often embodied in a three-dimensional array of volume picture elements, or "voxels." A holographic representation of an image thus provides significant advantages over a stereoscopic representation of the same image. This is particularly true in medical diagnosis, where the examination and understanding of volumetric data is critical to proper medical treatment.

While the examination of data that fills a three-dimensional space occurs in all branches of art, science, and engineering, perhaps the most familiar examples involve medical imaging where, for example, Computerized Axial Tomography (CT or CAT), Magnetic Resonance (MR), and other scanning modalities are used to obtain a plurality of cross-sectional images of a human body part. Radiologists, physicians, and patients observe these two-dimensional data "slices" to discern what the two-dimensional data implies about the three-dimensional organs and tissue represented by the data. The integration of a large number of two-dimensional data slices places great strain on the human visual system, even for relatively simple volumetric images. As the organ or tissue under investigation becomes more complex, the ability to properly integrate large amounts of two-dimensional data to produce meaningful and understandable three-dimensional mental images may become overwhelming.

Other systems attempt to replicate a three-dimensional representation of an image by manipulating the "depth cues" associated with visual perception of distances. The depth cues associated with the human visual system may be classified as either physical cues, associated with physiological phenomena, or psychological cues, which are derived by mental processes and predicated upon a person's previous observations of objects and how an object's appearance changes with viewpoint.

The principal physical cues involved in human visual perception include: (1) accommodation (the muscle driven change in focal length of the eye to adapt it to focus on nearer or more distant objects); (2) convergence (the inward swiveling of the eyes so that they are both directed at the same point); (3) motion parallax (the phenomenon whereby objects closer to the viewer move faster across the visual field than more distant objects when the observer's eyes move relative to such objects); and (4) stereo-disparity (the apparent difference in relative position of an object as seen by each eye as a result of the separation of the two eyes).

The principal psychological cues include: (1) changes in shading, shadowing, texture, and color of an object as it moves relative to the observer; (2) obscuration of distant objects blocked by closer objects lying in the same line of sight; (3) linear perspective (a phenomenon whereby parallel lines appear to grow closer together as they recede into the distance); and (4) knowledge and understanding that is either remembered or deduced from previous observations of the same or similar objects.

The various psychological cues may be effectively manipulated to create the illusion of depth. Thus, the brain can be tricked into perceiving depth which does not actually exist. Physical depth cues are not subject to such manipulation; the physical depth cues, while generally limited to near-range observation, accurately convey information relating to an image. For example, the physical depth cues are used to perceive depth when looking at objects in a small room. The psychological depth cues, however, must be employed to perceive depth when viewing a photograph or painting (i.e., a planar depiction) of the same room. While the relative positions of the objects in the photograph may perhaps be unambiguously perceived through the psychological depth cues, the physical depth cues nonetheless continue to report that the photograph or painting is merely a two-dimensional representation of a three-dimensional space.

Stereo systems depend on image pairs each produced at slightly different perspectives. The differences in the images are interpreted by the visual system (using the psychological cues) as being due to relative size, shape, and position of the objects and thus create the illusion of depth. A hologram, on the other hand, does not require the psychological cues to overrule the physical depth cues in order to create the illusion of a three-dimensional image; rather, a hologram produces an actual three-dimensional image.

Conventional holographic theory and practice teach that a hologram is a true three-dimensional record of the interaction of two beams of coherent, i.e. mutually correlated light, in the form of a microscopic pattern of interference fringes.

More particularly, a reference beam of light is directed at the film substrate at a predetermined angle with respect to the film. An object beam, which is either reflected off of or shines through the object to be recorded, is generally normally (orthogonally) incident to the film.

The reference and object beams interact within the volume of space occupied by the film and, as a result of the coherent nature of the beams, produce a standing (static) wave pattern within the film. The standing interference pattern selectively exposes light sensitive elements within the photographic emulsion making up the film, resulting in a pattern of alternating light and dark lines known as interference fringes. The fringe pattern, being a product of the standing wave front produced by the interference between the reference and object beams, literally encodes the amplitude and phase information of the standing wave front. When the hologram is properly re-illuminated, the amplitude and phase information encoded in the fringe pattern is replayed in free space, producing a true three-dimensional image of the object.

Conventional holographic theory further suggests that a sharp, well-defined fringe pattern produces a sharp, bright hologram, and that an overly strong object beam will act like one or more secondary reference beams causing multiple fringe patterns to form (intermodulation) and diluting the strength of the primary fringe pattern. Accordingly, holographers typically employ a reference beam having an amplitude at the film surface approximately five to eight times that of the object beam to promote the formation of a single high contrast pattern within the interference fringe pattern and to reduce spurious noise resulting from bright spots associated with the object. In general, the resolution of the fringe pixel density determines the resolution of the final image.

Since known holographic techniques generally surround the recording of a single hologram or, alternatively, up to two or three holograms, within a single region of the emulsion making up the film substrate, the stated objective is to produce the strongest fringe pattern possible to ensure the brightest holographic display. Accordingly, holographers typically attempt to expose a large number of photosensitive grains within the film emulsion while the object is being exposed. Since every point within the holographic film includes part of a fringe pattern that embodies information about every visible point on the object, fringe patterns exist throughout the entire volume of the film emulsion, regardless of the configuration of the object or image which is the subject of the hologram.

As a consequence of the above, the creation of strong, high contrast fringe patterns necessarily results in rapid consumption of the finite quantity of photosensitive elements within the emulsion, thereby limiting the number of high contrast holograms that can be produced on a single film substrate to two or three. Some holographers have suggested that as many as 10 to 12 different holographic images theoretically may be recorded on a single film substrate; superimposing more than a small finite number of holograms has generally not been considered possible in the context of conventional hologram theory.

Known holographic display methods are useful primarily for the display of static images. Additionally, known holographic display devices are useful primarily for the display of recorded images.

Accordingly, there remains in the field of holographic projection a need for a display method able to display moving images. Additionally, there remains in the field a need for a display method able to display real-time computer-generated, rather than pre-recorded, three-dimensional images.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention relates to a method and apparatus for display of three-dimensional images. Although methods have been developed for display of three-dimensional images, numerous limitations have been identified in connection with prior holographic display devices. Specifically, known holographic display methods are useful primarily for the display of static images. Additionally, known holographic display devices are useful primarily for the display of recorded images.

There remains in the field of holographic projection a need for a display method able to display moving images. Additionally, there remains in the field a need for a display method able to display computer-generated, rather than prerecorded images. The inventors of the present invention have recognized that known holography methods, when used in combination with modern image-processing algorithms and recent advances in digital light processing technology, can be used to create three-dimensional moving holograms that can be generated and modified "on the fly" by a computer. Alternately, the interference patterns corresponding to the desired three-dimensional holograms may be pre-computed and recorded on a storage medium, and later played back in real time.

In the present invention, a time-dependent computed image or virtual model of a real object is stored in, or generated by, a computer or dedicated digital signal processor (DSP). The image or model is then converted by the computer or DSP into its Fourier, or holographic, transform. The holographic transform is displayed on a light modulation device that is illuminated by one portion of a coherent light emission. The remaining portion of the same emission is combined with the holographic transform at a plane to create a three-dimensional image.

Certain embodiments of the present invention employ a digital micro-mirror device for light modulation. Digital micro-mirror devices have an advantage over other known light modulation devices such as liquid crystal displays (LCDs) owing to the fact that micro-mirrors preserve phase coherence of the light, whereas LCDs do not. Because of the high frequencies at which micro-mirrors can be moved, the device of the present invention allows for the creation and display of real-time, three-dimensional moving holograms.

In certain devices embodying the present invention, three-dimensional visual data can stream at full video rate without the necessity of higher bandwidth because the data representing the holographic transforms takes only as much bandwidth as normal two-dimensional video. Similarly to two-dimensional video, an increase in the resolution of the digital micro-mirror device increases the resolution of the three-dimensional images displayed.

In certain embodiments, the projection device may display in multiple colors through the use of a multi-mode laser or multiple lasers. Applications for the projection device of the present invention include next-generation television and movie projection, three-dimensional scientific workstations, haptics, interactive volumes, and three-dimensional robotic control displays.

The novel features of the present invention will become apparent to those of skill in the art upon examination of the following detailed description of the invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE DRAWINGS

The embodiments and examples set forth herein are presented to best explain the present invention and its practical application and to thereby enable those skilled in the art to make and utilize the invention. Those skilled in the art, however, will recognize that the description and examples are presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The present invention relates to a method and apparatus for display of three-dimensional images. In the present invention, a time-dependent computed image or virtual model of a real object is stored in a computer or dedicated digital signal processor (DSP). The stored image or model is then converted by the computer or DSP into its Fourier, or holographic, transform. The holographic transform is displayed on a light modulation device that is illuminated by one portion of a coherent light emission. The remaining portion of the same light emission is combined with the holographic transform at a plane to create a three-dimensional image. Because of the high frequencies at which modern light amplification devices can be cycled, the device of the present invention allows for the creation and display of real-time, three-dimensional moving holograms.

Figure 1:
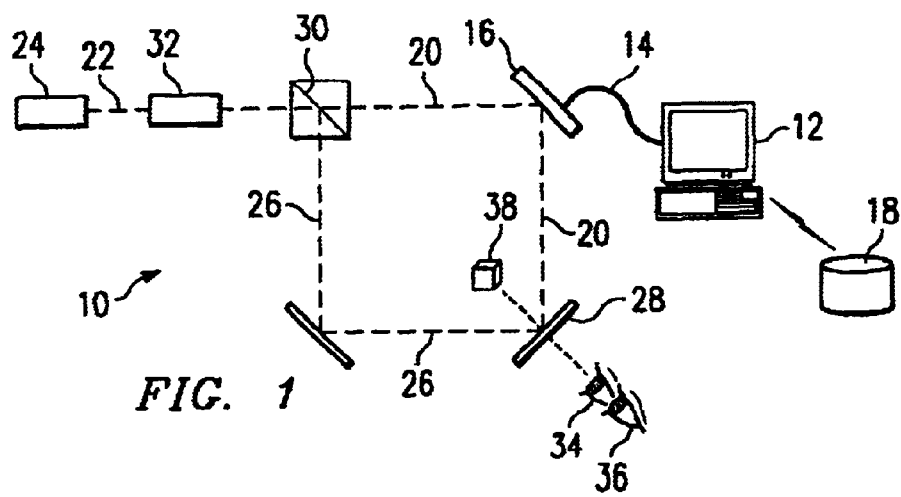
FIG. 1 is a schematic diagram of a three-dimensional display device according to one embodiment of the present invention.

FIG. 1 is a schematic diagram of a three-dimensional display device 10 according to one embodiment of the present invention. As seen in FIG. 1, three-dimensional display device 10 includes a computer 12 operably connected by link 14 to a digital micro-mirror device (DMD) 16. Although the display device incorporates DMD 16 for light modulation, other light modulation devices will be known to those of skill in the art.

Digital Micro-mirror Devices (DMDs) such as DMD 16 are becoming widely used display devices owing to their high contrast, high speed and high resolution. One may refer to U.S. Pat. No. 4,680,579 for details of a DMD apparatus. Generally, a DMD incorporates a matrix of micro-mirrors contained in a common plane. Each micro-mirror in the DMD is of miniature size, and may be as small as a few microns. The micro-mirrors are individually adjustable between a first and second position by a voltage applied to each micro-mirror pixel. The respective positions may be identified as "on" and "off".

If a particular micro-mirror of a DMD is in the "on" position, an incident illumination light is reflected by this micro-mirror and is delivered to a viewing device. Such reflected illumination light is called "useful" illumination light. If a micro-mirror is in the "off" position, the reflected illumination light is spatially displaced with respect to the light beam reflected by it in the "on" position, and is not received by the viewing device. Illumination light which is reflected by a micro-mirror in "off" position is called "useless" illumination light.

Figure 2:
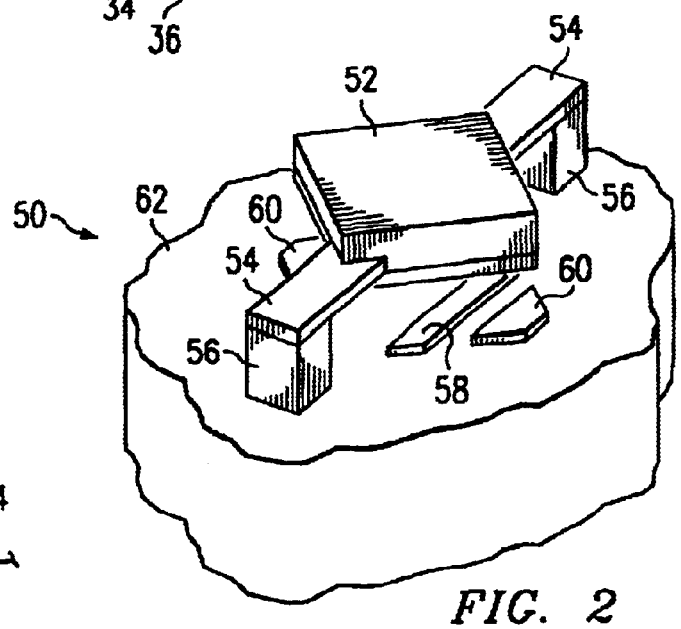
FIG. 2 is an isometric diagram of a Digital Micro-mirror Device (DMD) according to one embodiment of the present invention.

FIG. 2 illustrates one embodiment of a single mirror element 50 of DMD 16. A typical DMD 16 has an array of hundreds, thousands, or even millions of such mirror elements 50. In one example of such a device, the array has 768 mirror elements per row and 576 rows. When light from light source 24 is incident on the surface of the mirror elements 50, each mirror element 50 provides one pixel of an image.

Referring to both FIGS. 1 and 2, light source 24 illuminates the surface of DMD 16 with coherent light. Each mirror element 50 has a tilting mirror 52 supported by torsion hinges 54 attached to support posts 56. The mirrors 52 are positioned over a memory cell 62, which is fabricated on a silicon substrate. Electrostatic forces based on the data in the memory cells of memory cell 62 tilt each mirror 52 either about +10 degrees (on) or about −10 degrees (off), thereby modulating the light incident on the surface of the DMD 16. Light reflected from the on mirrors 52 creates an image on an image plane. Light from the off mirrors is reflected away from the image plane.

Referring now especially to FIG. 2, directly over each memory cell 62 are two address electrodes 58 and two landing pads 60. The mirror 52 has three states. It operates in a bistable mode, tilting approximately 10 degrees about the hinges 54 in one or the other direction. The third state is a flat position to which the mirrors 52 return when the display is not in operation.

In effect, the mirror 52 and the address electrodes 58 form capacitors. When +5 volts (digital 1) is applied to one address electrode 58, 0 volts (digital 0) is applied to the other address electrode 58, and a negative bias to the mirror 52, the electrostatic charge thus created causes mirror 52 to tilt toward the +5 volt electrode 58. The voltage on the address electrode 58 starts the mirror 52 tilting, whereupon it continues under its own momentum until it hits the landing pad 60.

Once a mirror 52 tilts in either direction, it remains electro-mechanically latched in that state. Merely changing the states of the address electrodes 58 will not cause the mirror to move; it is removal of the bias on each mirror 52 that causes it to return to its untilted position. When the bias is reapplied, the mirrors 52 tilt in accordance with their new address states.

The mirror element 50 of FIG. 2 has a "torsion beam" design. The invention is useful, of course, with other DMD designs. For example, in a cantilever design, a mirror is supported at one end by a hinge and its free end tilts down toward its address electrodes. Further details of various types of DMDs are set out in U.S. Pat. No. 4,956,619, entitled "Spatial Light Modulator"; U.S. Pat. No. 5,061,049, entitled "Spatial Light Modulator and Method"; and U.S. Pat. No. 5,083,857, entitled "Multi-Level Deformable Mirror Device". Each of these is incorporated by reference herein.

In the embodiment shown in FIG. 1, computer 12 generates holographic transforms from images stored in data storage unit 18, which are then sent to the DMD 16 through link 14. In one embodiment of the present invention, the holographic transforms are computed using a Fourier transform algorithm. In certain embodiments, computer 12 may incorporate a dedicated digital signal processor for computing Fourier transforms. In other embodiments, computer 12 can read and project pre-computed transforms previously transformed and recorded on a storage medium such as a DVD.

Traditionally, Fourier transform processes were performed on time domain data to determine the frequency components present in the signal. Such Fourier transform algorithms convert time domain data obtained by measuring an incoming signal along a predetermined time interval to frequency domain data to obtain the frequency spectrum of the incoming signal. In addition to their use in frequency analysis, Fourier transforms have been found to be useful for certain image processing applications, including the generation of holographic images.

In certain applications, a Fourier transform method may be based on what is known as a discrete Fourier transform, or DFT, where a signal response is measured in terms of discrete harmonics determined by a sequence of equally spaced samples. A discrete Fourier transform generally requires a large number of calculations. In particular, for N measured data points, N*N transform coefficients must be calculated. Consequently, for large data sets, the discrete transform process may take a long time to complete the calculation.

Accordingly, certain embodiments of the present invention may employ the Fast Fourier Transform, or FFT, algorithm, developed by J. W. Cooly and J. W. Tukey. The FFT algorithm reduces the number of calculations required to obtain a result. In essence, an FFT algorithm reduces the number of calculations of a typical DFT by eliminating redundant operations when dealing with Fourier series, thereby sacrificing a certain level of accuracy in exchange for a substantial reduction in processing time. The number of operations required to calculate an FFT for N data samples is represented by N $\log_2 N$. Thus, the FFT requires significantly fewer calculations than that required in the DFT, and for large data arrays, the FFT is considerably faster than the conventional DFT.

Alternate embodiments of the present invention may employ other Fourier transfer algorithms. One example of such an algorithm is the Chirp Z transform, which is an improved version of FFT that can perform a Fourier transform having a higher resolution than that of the FFT. This Fourier transform method is described by Rabiner and Gold in "Theory and Application of Digital Signal Processing", pages 393–398, 1975. As far as transformation time is concerned, since the Chirp Z transform process typically carries out the FFT process three times, the Chirp Z transform requires a longer Fourier transformation time than that required for the traditional FFT process.

In the embodiment shown in FIG. 1, DMD 16 is illuminated by an illumination beam 20, which is a first portion of the beam 22 emitted by light source 24. A reference beam 26, which is the second portion of the beam 22, is directed to the imaging plane 28 by beam splitter 30. In various embodiments, beam splitter 30 may incorporate one or more beam-splitting cubes, one or more wave plates, and one or more mirrors. As is known in the art, the beam powers of the two beams 20 and 26 could be similar or significantly different, such as the power of beam 20 being significantly greater than or less than the power of beam 26.

Light source 24 may be any one of a variety of light generating devices, and may incorporate a combination of separate light sources acting together. In certain embodiments, the light source 24 is one or more laser light sources. In various embodiments, white lasers, argon-gas lasers, Helium-Neon, diode, YAG, or ruby lasers could be employed.

In one embodiment, the present invention employs a single solid-state laser, either alone or in combination with other elements, for the light source 24. As examples, diode-pumped solid-state lasers are known to be efficient, compact and reliable sources of high beam quality optical radiation. The group of solid-state lasers includes neodymium and ruby lasers, but there are many variations. In one embodiment of the present invention, a diode laser may be employed to optically pump a solid-state laser rod of ruby, neodymium-YAG, neodymium-glass, titanium-sapphire, alexandrite, lithium compounds or the like. In alternate embodiments, the system may be adapted to accept any solid-state laser generator or any gas laser including helium-neon, an ion laser such as an argon laser, krypton laser, xenon laser, or a molecular laser such as a carbon dioxide laser or excimer laser.

The embodiment shown in FIG. 1 incorporates an optics group 32 between the laser 24 and the beam splitter 30. In various embodiments, the optics group 32 may incorporate conditioning optics, a beam expander, a color wheel, an RF modulator or other elements. In various embodiments, polarizers, lenses, mirrors, diffraction gratings, apertures, half-wave plates, or filters of various types may be employed to condition, focus, and direct the light from light source 24 to beam splitter 30 in an ideal manner.

Illumination beam 20 and reference beam 26 are focused and directed to the same point on the imaging plane 28. In varying embodiments, imaging plane 28 may be one surface of a transparent or translucent plate. Imaging plane 28 may incorporate a photo-refractive material and may incorporate short-duration image-retention or phosphorescent elements or materials including short to long phosphor materials.

With such an arrangement, the illumination beam 20 and reference beam 26 will form an interference pattern, which will be viewed by human eyes 34 and 36 as a three-dimensional image 38 disposed on the opposite side of imaging plane 28. In an alternate embodiment, image 38 may appear on the same side of imaging plane 28.

Figure 3:
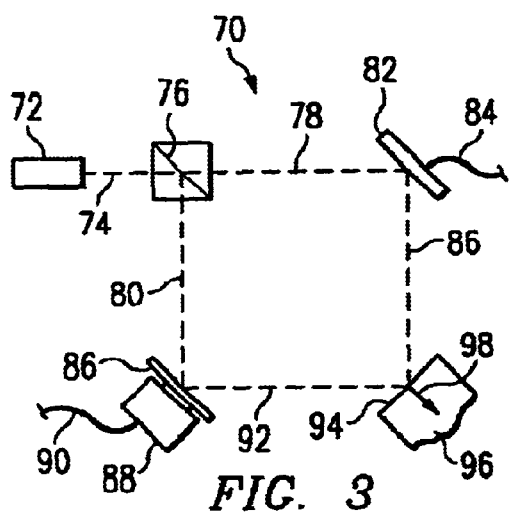
FIG. 3 is a schematic diagram of a three-dimensional display or phase-encoded communication device according to a second embodiment of the present invention.

FIG. 3 depicts a second embodiment of a holographic system 70 according to the present invention. Holographic system 70 includes a light source 72, which could be a laser, to generate a source beam 74. Source beam 74 produced by light source 72 is optically coupled to a beam splitter 76, which divides source beam 74 into an object beam 78 and a reference beam 80. A DMD 82, controlled by a computer through link 84, is optically coupled to beam splitter 76 to reflect a portion of the object beam 78 into an RF modulator 87 in the form of beam 86. RF modulator 87 imparts spatial dependent information to beam 86. The RF modulated beam 88 exiting the RF modulator 87 is directed to an end surface 94 of an optical wave-guide 96. Although various embodiments of the present invention may or may not incorporate RF modulator 87, this element provides for a significant increase in bandwidth of other designs.

Reference beam 80 passing out of beam splitter 76 is directed to mirror 89, which in certain embodiments is mounted on an actuator 90. Actuator 90 is designed to move mirror 89 with a precision on the order of magnitude of the wavelength of the light generated by light source 72. With this design, the phase of reference beam 92 with respect to modulated beam 88 may be modulated and controlled. In the embodiment shown in FIG. 3, the position of actuator 90 is controlled by a computer through link 91.

One type of actuator known to be useful for rapid, small magnitude motion such as that required by holographic system 70 is the piezoelectric actuator. A variety of piezoelectric actuator designs are known in the art.

One class of piezoelectric actuators, which make motion under the influence of a voltage applied across a piezoelectric element made by bonding a piezoelectric material onto thin elastic plates made of a metal or the like, are used in various devices, including light deflectors. Actuators of this type are classified into bimorph type, in which piezoelectric ceramic plates are bonded on both sides of a thin elastic plate, and unimorph type, in which a piezoelectric ceramic plate is bonded on only one side of a thin elastic plate. In general, the displacement of either type of actuator is roughly proportional to the applied voltage. Maximum displacement may be further increased by the application of an alternating drive voltage signal having a frequency equal to the resonance frequency of the piezoelectric element.

An electric voltage is applied across the external electrodes in order to generate a displacement. Adjacent internal electrode layers sandwiching a particular piezoelectric ceramic layer serve as counter electrodes, applying an electric field to the particular piezoelectric ceramic layer. Thus, the particular piezoelectric ceramic layer, and therefore the stack body, is displaced in response to the application of the electric voltage across the external electrodes.

Mirror 89 diverts reference beam 80 from beam splitter 76 to the end surface 94 of an optical waveguide 96, where its path intersects the path of object beam 86 reflected by DMD 82. Object beam 86 and reference beam 92 generate an interference pattern on end surface 94, thereby generating a light signal 98 within waveguide 96 due to the interrelationship of the phase of the light beams 86 and 92.

Waveguide 96 may be employed in any of a variety of optical communications systems. Such systems are used for transmitting telephone calls, television signals, and other audio and/or visual signals as well as various data telecommunications.

In recent years, the trend has been towards the use of increasing numbers of optical fiber links. Such systems generally use optical fiber in a passive role for transmitting data and communications point-to-point using conventional electronics for all applications and multiplexing requirements. Reasons for this increased usage include the facts that optical fibers are lighter in weight and less expensive than electrical conductors, and are not subject to electrical interference. Typically, a communication system includes a light source such as a laser diode or an LED, and a photo detector such as a photodiode, connected through a single mode or multimode fiber-optic cable. Information is transmitted in digital form, as a series of light pulses that form a bit stream.

In certain applications, an array of optical fibers can be combined into a light-transmitting apparatus known as an image conduit, which is essentially a bundle of optical fibers having a fixed relationship to one another along the length of the conduit. At a first end of the conduit, optical components focus light onto the densely packed ends of the fibers. The fiber bundle transmits the light from the first end to the second end. Exemplary systems are disclosed in U.S. Pat. No. 4,281,929, issued to Lord et al., and U.S. Pat. No. 3,610,726, issued to Aijala.

In brief, there are two general classes of optical fibers: single mode fibers and multimode fibers. Multimode fibers are generally less costly that single mode fibers, as are the input/output mechanisms that are used to inject light into the input of the fibers and to receive light from the output of the fibers. A single mode fiber is generally of a very small diameter. Thus, all components associated with the input/output thereof are physically small and must be manufactured with high precision. By definition, single mode fibers have but one spatial channel having a large frequency bandwidth. While multimode fibers have a cost advantage, the art has generally been unable to utilize the many communication channels or modes of these fibers, so that usually one channel of limited bandwidth is used. One of the problems with using the many channels of a multimode fiber is the problem of demultiplexing the fiber's multi-channel output.

In order to increase the information-carrying capacity of a fiber-optic cable, frequency and time division multiplexing techniques have been widely explored. Examples of prior art frequency division multiplexing optical communication systems are described in U.S. Pat. No. 4,592,043. However, a number of problems have been encountered in implementing such systems. These problems include frequency variations of the semiconductor light sources, matching of the multiplexer and demultiplexer coupling frequencies, and the need for relatively large channel spacing to accommodate aging effects and manufacturing tolerances of semiconductor lasers.

The optical fiber cable between the transmitter and receiver is essentially a dumb link. The trend in recent years has been towards higher and higher data transmission rates reaching into the Gb/s range. This requires the use of more costly electronic components and optical sources. Much of the early single-mode fiber that has been deployed is unable to accommodate these high transmission rates. Furthermore, a variety of protocols are presently in use. These include DS3, SONET, International (E3), ATM, etc. When several of these are to be transmitted simultaneously over a common bus, it is necessary to digitally convert them to a single protocol.

In existing systems, information is usually multiplexed in time-division format. The diverse signals are multiplexed together by combining them temporally. For example, 24 digital signal zero (DS0) level signals are sampled sequentially and combined to form the next level of signal transmission, which is T1 (DS1). The outputs of 4 T1 transmitters may be sampled and stacked sequentially in time by a T2 (DS2) multiplexer. Similarly, the outputs of 28 T1 or 7 T2 transmitters may be sequentially sampled and combined by a T3 (DS3) multiplexer. This process of combining or multiplexing lower level telemetry signals is repeated many times until signals in the GB/s range are produced.

Certain embodiments of the present invention, which provide for phase-encoding of the digital optical signals, may be combined with other multiplexing schemes in order to add bandwidth capacity to existing fiber optic lines. As such, the present invention employed in combination with, for example, existing time and frequency multiplexing schemes, provides for the possibility of time/phase, frequency/phase, and time/frequency/phase multiplexing.

Figure 4:
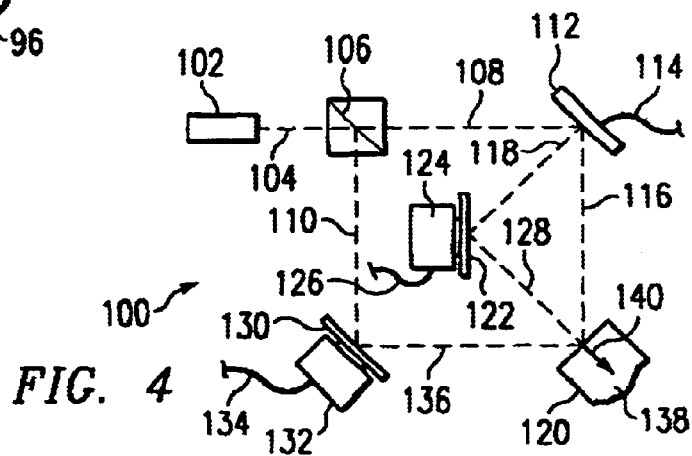
FIG. 4 is a schematic diagram of a three-dimensional display or phase-encoded communication device according to a third embodiment of the present invention.

FIG. 4 depicts a third embodiment of a holographic system 100 according to the present invention. Holographic system 100 includes a light source 102, which could be a laser, to generate a source beam 104. Source beam 104 produced by light source 102 is optically coupled to a beam splitter 106, which divides source beam 104 into an object beam 108 and a reference beam 110. A DMD 112, controlled by a computer through link 114, is optically coupled to beam splitter 106 to reflect a portion of the object beam 108 to an end surface 120 of an optical waveguide 138. A second portion of object beam 108, functioning as a second reference beam 118, is directed to mirror 122 by the "off" elements of the DMD 112. In the holographic system depicted in FIG. 4, reference beam 118 may have an adjustable phase control through the use of actuator 124, which may be controlled by a computer through link 126, thereby directing a phase-controlled reference beam 128 into waveguide 138.

Reference beam 110 passing out of beam splitter 106 is directed to mirror 130, which in certain embodiments is mounted on an actuator 132. Actuator 132 is designed to move mirror 130 with a precision on the order of magnitude of the wavelength of the light generated by light source 102. With this design, the phase of reference beam 136 with respect to object beam 116 and reference beam 128 may be modulated and controlled. In the embodiment shown in FIG. 4, the position of actuator 132 is controlled by a computer through link 134.

Mirror 130 diverts reference beam 110 from beam splitter 106 to an end surface 120 of an optical waveguide 138, where its path intersects the path of object beam 116 and reference beam 128 reflected by DMD 112. Object beam 116, reference beam 128, and reference beam 136 together generate an interference pattern on an end surface 120 of waveguide 138, thereby generating a light signal within waveguide 138 due to the interrelationship of the phase of light beams 116, 128, and 136.

It is known that a coherent light beam such as beam 108 will produce a diffraction pattern when reflected off of a device such as DMD 112. The diffraction pattern will consist of a principal central pattern having a high intensity along the center of the beam path surrounded by a series of side patterns on either side having lesser intensity than the central pattern. Each of these diffraction patterns will, however, contain the entire pattern displayed on DMD 112, so that each pattern contains the entirety of the data. In holographic system 100, it can be seen that optical waveguide 138 is disposed to receive the principal central pattern of beam 116, and will receive the strongest light signal.

Optical waveguides 140 and 142 are disposed on either side of optical waveguide 138, and are each positioned to receive one side pattern contained in the diffraction pattern of beam 116. As such, each of optical waveguides 140 and 142 will receive the pattern containing the data being transmitted, but at a lower intensity as compared to the central pattern.

In order for optical waveguides 140 and 142 to function in the same manner as described for optical waveguide 138, it will appreciated by those of skill in the art that additional reference beams similar to reference beams 128 and 136 would need to be provided and that this may require the incorporation of additional elements, such as one or more beam splitters similar to beam splitter 106. These additional elements have been omitted from FIG. 4 for clarity, but the manner of their use will be clear to those of skill in the art. In certain embodiments, optical waveguides 140 and 142 may receive phase-encoded and/or RF-modulated beams modified in the manner shown in FIGS. 3 and 4.

As will be appreciated by those of skill in the art, the teachings of the present invention may be employed in a variety of contexts. The present invention may be employed for recreational uses including the creation of, for example:

real-time three-dimensional television,
moving pictures,
video games,
virtual reality simulations, or
planetarium displays,
holograms embodied in the form of holographic films, as examples.

The present invention may also be employed in the medical and scientific context, for the viewing of, for example:

computed tomography (CT),
x-ray,
ultrasound,
magnetic resonance imaging data, or
magnified electron microscope images.

In addition to the imaging applications for which the present invention is suited, its teachings may be employed in telecommunications to increase the bandwidth and security of optical communications, both in the civilian and military contexts. The apparatus of the present invention may be combined with fiber optic waveguide networks to provide high-speed mega channel optical data transmission, optical encoding, high-speed Internet and voice telephony. The apparatus and methods of the present invention may be employed to develop encryption and secure communications applications not heretofore possible. Other applications will be apparent to those of skill in the art of the present invention.

In certain embodiments, the present invention may also be employed for light-controlled or activated optical chemistry and tissue forming applications.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A light interferogram projection device comprising:

a coherent light beam-generating device;

a beam splitter disposed to receive a first coherent light beam from the coherent light beam-generating device and to emit a second coherent light beam and a third coherent light beam at differing angles;

a digital micro-mirror device disposed to receive a holographic transform generated from an image or model, and further disposed to display the holographic transform for illumination by the second coherent light beam from the beam splitter; and an imaging plane disposed to simultaneously receive both the holographic transform from the digital micro-mirror device and the third coherent light beam from the beam splitter, and further disposed to combine the simultaneously received holographic transform and third coherent light beam into an interferogram projection comprising the image or model.

2. The interferogram projection device of claim 1 wherein the coherent light is from a laser.

3. The interferogram projection device of claim 2 wherein the laser is selected from the group consisting of solid state lasers, gas lasers, ion lasers, and molecular lasers.

4. The interferogram projection device of claim 1 further comprising a phase-modulation device for modulating the phase of the third coherent light beam relative to the phase of a light beam carrying the holographic transform from the digital micro-mirror device.

5. A light interferogram projection device comprising:

a coherent light beam-generating device;

a beam splitter disposed to receive a first coherent light beam from the coherent light beam generating device and to emit a second coherent light beam and a third coherent light beam at differing angles;

a processor programmed to receive an image or model and to generate a holographic transform from the image or model;

a digital micro-mirror device connected to the processor in such manner as to display the generated holographic transform thereon and disposed to receive the second coherent light beam from the beam splitter; and an imaging plane disposed to simultaneously receive both the generated holographic transform from the digital micro-mirror device and the third coherent light beam from the beam splitter, and to combine the simultaneously received holographic transform and third coherent light beam into an interferogram projection comprising the image or model.

6. The interferogram projection device of claim 5 wherein the coherent light is generated by a laser.

7. The interferogram projection device of claim 6 wherein the laser is selected from the group consisting of solid state lasers, gas lasers, ion lasers, and molecular lasers.

8. The interferogram projection device of claim 5 further comprising a phase-modulation device for modulating the phase of a light beam carrying the holographic transform from the digital micro-mirror device relative to the phase of the third coherent light beam from the beam splitter.

9. The interferogram projection device of claim 8 wherein the phase-modulation device is a mirror mounted on a piezoelectric actuator.

10. A method of creating a light interferogram projection comprising:

generating a coherent light beam;

splitting the first coherent light beam into a second coherent light beam and a third coherent light beam projecting at differing angles;

disposing a pattern derived from an image or model on the surface of a digital micro-mirror device disposed to receive the second coherent light beam from the beam splitter, and generating a modulated light pattern;

simultaneously receiving both the modulated light pattern and the third coherent light beam onto an imaging plane; and combining the simultaneously received modulated light pattern and third coherent light beam into an interferogram projection comprising the image or model.

11. The method of claim 10 wherein the coherent light bean is a laser.

12. The method of claim 11 wherein the laser is selected from the group consisting of solid state lasers, gas lasers, ion lasers, and molecular lasers.

13. The method of claim 10 wherein the pattern is a holographic transform generated from the image or model by a processor connected to the digital micro-mirror device.

14. The method of claim 10 wherein the modulated light pattern represents a holographic transform.

15. The method of claim 10 further comprising the step of modulating the relative phase of the modulated light pattern and the third coherent light beam.

16. The method of claim 15 wherein the relative phase of the modulated light pattern and the third coherent light bean are modulated using a mirror mounted on a piezoelectric actuator.

17. The method of claim 10 wherein:

The power of the third coherent light beam is significantly less than the power of the second coherent light beam.

* * * * *